July 21, 1959  H. A. F. ROCHA  2,895,784
TIME BASE CONVERTER
Filed June 24, 1957  3 Sheets-Sheet 1
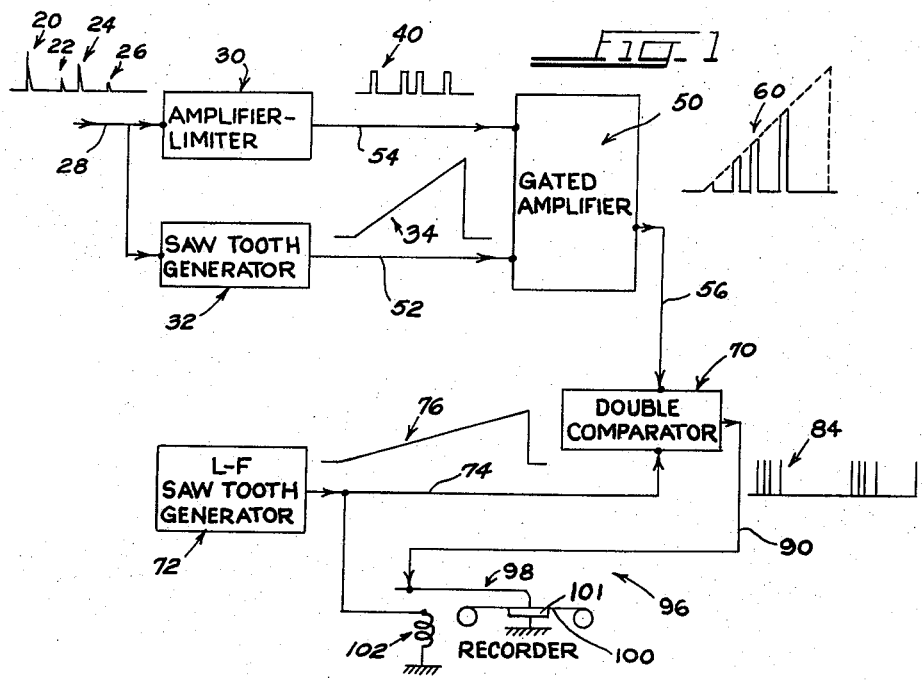
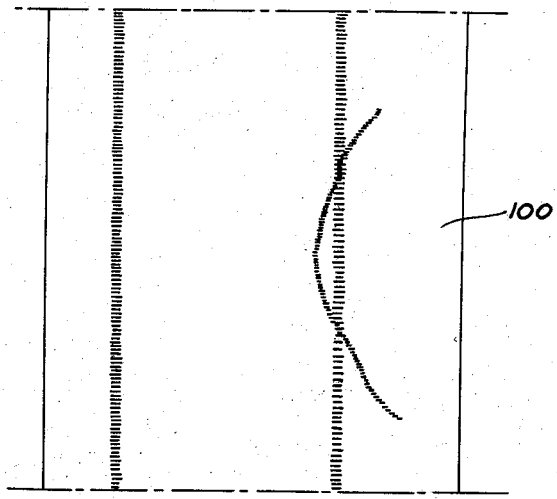
INVENTOR.
HENRIQUE A. F. ROCHA
BY

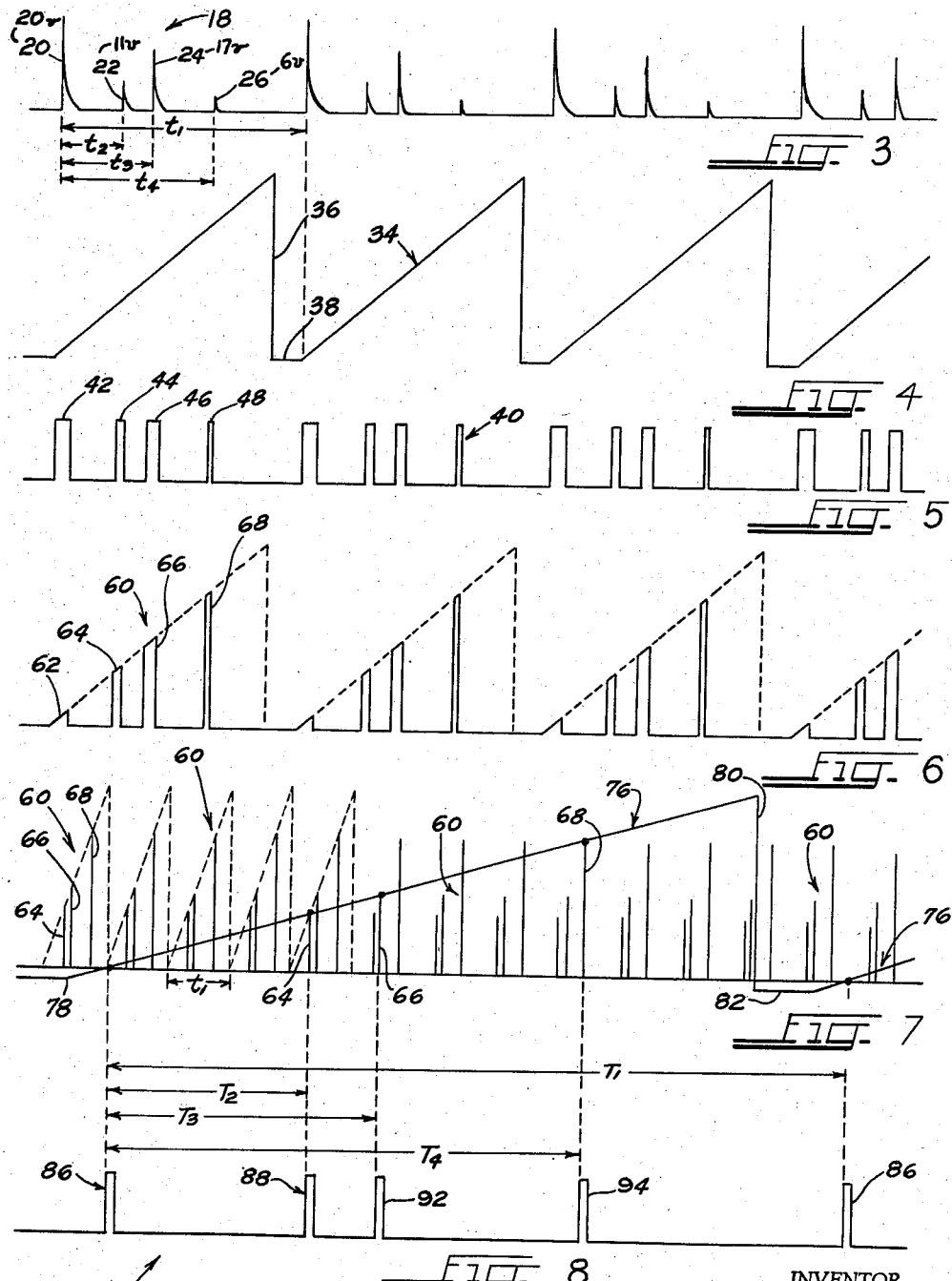

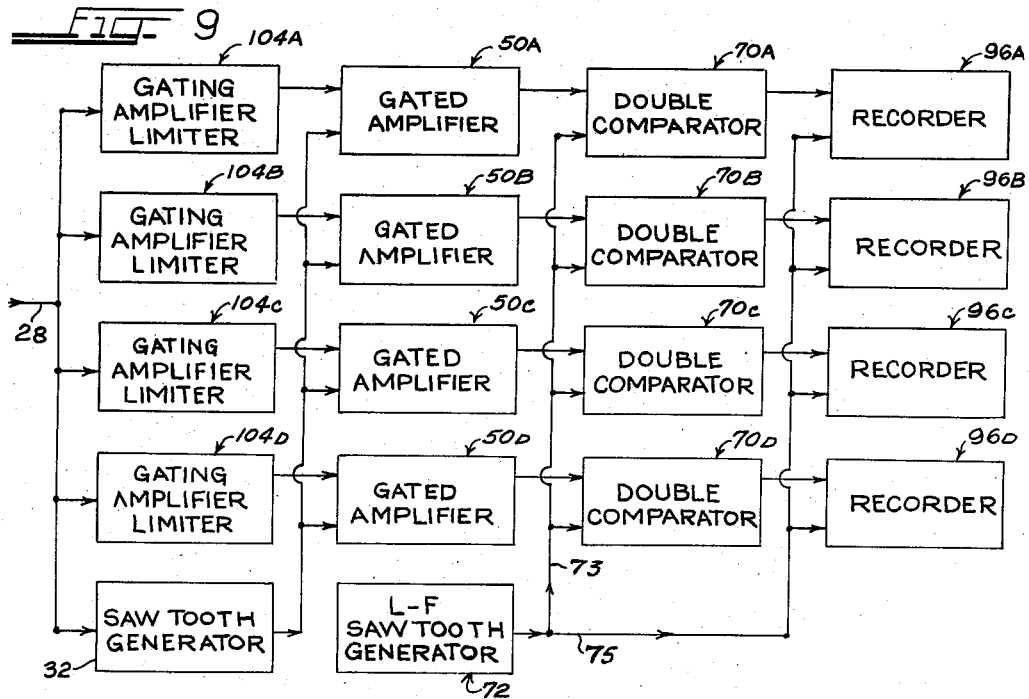
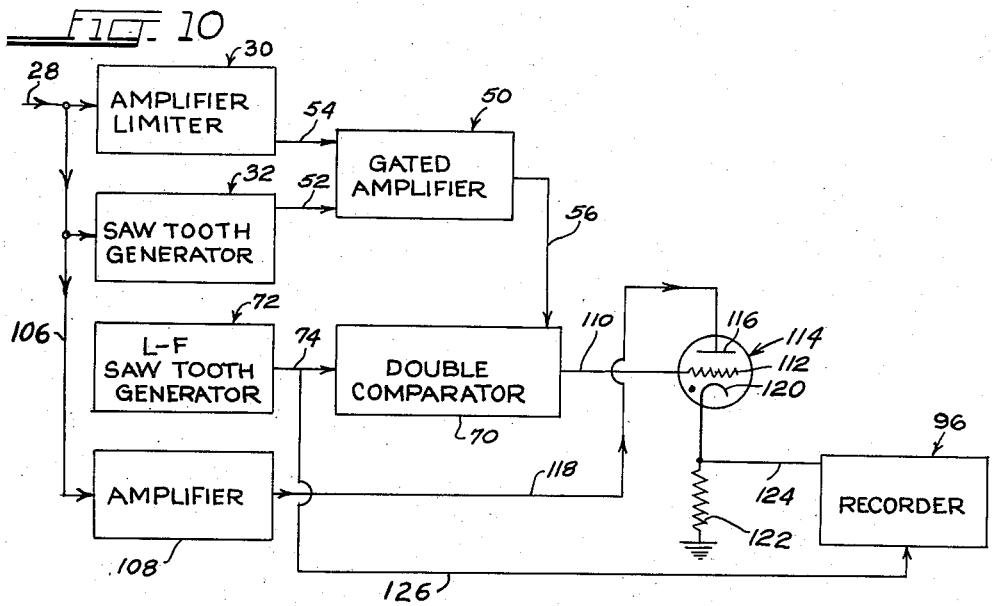

United States Patent Office 2,895,784
Patented July 21, 1959

2,895,784

TIME BASE CONVERTER

Henrique A. F. Rocha, Schenectady, N.Y., assignor to General Electric Company, a corporation of New York Application June 24, 1957, Serial No. 667,577

16 Claims. (Cl. 346—33)

This invention relates to electrical circuits and particularly to electrical circuits for changing a relatively high frequency repetitive event pattern to a relatively low frequency pattern in which the relative spacing of the repeating events is maintained in the low frequency pattern.

There are several types of devices utilized today for measuring distances between objects and for measuring intervals between events and other intervals of time. In the devices utilized to measure distances between objects a pulse which may be a sound wave or an electromagnetic radiation is transmitted and directed toward the object or boundary to be located. The boundary to be located reflects energy which is detected at the point of origin of the pulses. The time interval between the transmission of each pulse and the reception of the echoes is proportional to the distance between the transmitting antenna or transducer and the reflecting surface producing the echoes. The pulses are transmitted at regular intervals which are much longer than the echo intervals.

The most common method of display of the transmitting pulse and the echoes in such systems has been on the face of a cathode ray tube. Such a display exhibits the two basic parameters for each echo, namely the amplitude and the time interval between the initial pulse and the return of the reflected energy. However, such information is obtainable only while the pulses are being transmitted and the echoes received or for a short period thereafter by the use of long persistency screens.

The need has been recognized in the art for a system to store such information on a permanent record for subsequent use and study. The permanent record of the maximum amplitude of the echoes produced within a predetermined time interval can be achieved by known instruments such as by a gated amplifier-peak detector system.

The permanent recording of the second parameter, namely, the time interval between the initial pulse and the return of the reflected energy cannot be accomplished by known devices. One example of permanent recording devices which it is desirable to use is an electromagnetic recorder. The time intervals to be recorded, however, are substantially smaller than the minimum response capabilities of the best of such recorders. For example, in the ultrasonic testing of steel, the echoes from two reflecting surfaces one inch apart are separated by only eight millionths of a second. Certain of the best electromagnetic recorders for making a permanent record on paper that are available today have a high frequency limit of approximately one hundred cycles per second.

Accordingly, it is an object of the present invention to provide time base converters which can change relatively high frequency information to a form which is low frequency in character and in which the proportions between the information variables are maintained constant although presented at a lower frequency rate.

Another object of the invention is to provide a time base converter of the type set forth in which relatively high frequency repetitive events can be changed to a relatively low frequency form for use with low frequency permanent recording devices.

Yet another object of the invention is to provide a time base converter or time vernier in which the relative time intervals between adjacent events can be substantially changed while maintaining the relative values of the time intervals between the repetitive events.

Still another object of the invention is to provide a time base converter of the type set forth which is accurate and dependable in operation.

Yet another object of the invention is to provide a time base converter of the type set forth in combination with a gated amplifier-peak detector whereby to catalog and permanently record events according to amplitude.

A further object of the invention is to provide a recording device in which relatively high frequency repetitive events can be recorded both as to amplitude and time interval on relatively slow low frequency permanent recording devices such as an electromagnetic recorder.

In conjunction with the foregoing object, it is another object of the invention to provide a device for displaying both the amplitude and time interval of relatively high frequency repetitive events on the screen of a cathode ray tube having a relatively slow or low frequency deflection system.

These and other objects and advantages of the invention will be better understood from the following description when taken in conjunction with the accompanying drawings. In the drawings wherein like reference numerals have been utilized to designate like parts throughout:

Figure 1 is a schematic drawing in block form of a time base converter or time vernier made in accordance with and embodying the prinicples of the present invention;

Figure 2 is a diagrammatic representation of the permanent record made by an electromagnetic recorder forming a part of the time base converter illustrated in Figure 1 of the drawings;

Figure 3 is a diagrammatic representation of a relatively high frequency series of repetitive events which is to be converted to a relatively low frequency base for display and permanent recording purposes while maintaining the relative positioning of the events within a group.

Figure 4 is an illustration on a large scale of the output from a saw tooth generator forming part of the time base converter of Figure 1 and showing the relationship thereof to the repetitive events depicted in Figure 3;

Figure 5 is a diagram of the output from the amplifier-limiter forming a part of the time base converter of Figure 1 and showing the relationship to the repetitive events of Figure 3;

Figure 6 is a diagram of the output from the gated amplifier forming a part of the time base converter of Figure 1 and showing the relationship to the output from the amplifier-limiter in Figure 5 and the repetitive events illustrated in Figure 3;

Figure 7 is a diagram illustrating the manner in which the double comparator forming a part of the time base converter of Figure 1 operates, the time base of the repetitive events illustrated in Figure 3 being shown superimposed thereon and the time base thereof shortened for purposes of illustration;

Figure 8 is a diagram of the output from the time base converter of Figure 1 which is applied to the recorder of Figure 1;

Figure 9 is a schematic diagram in block form illustrating a pulse size cataloger incorporating therein the time base converter of the invention; and Figure 10 is a schematic diagram partially in block form of a recording device including the time base converter of the present invention and arranged to record both the amplitude of repetitive events and the time intervals therebetween at a much reduced frequency.

There is shown in Figure 3 of the drawings one example of a group of repeating pulses or events of the type which is desired by the present invention to change to a different time base. These repetitive events might be for example the output from an ultrasonic detection apparatus. The output includes a representation of the transmission or initial pulse 20 followed by a series of reflected or echo pulses 22, 24 and 26. The pattern comprising pulses 20 through 26 is repeated periodically at a time interval $t_1$. The time interval between the initial pulse 20 and pulse 22 is designated $t_2$, the time interval from pulse 20 to 24 being $t_3$, and the pulse interval between pulse 20 and pulse 26 being $t_4$. This pattern is repeated with a period $t_1$ which is substantially larger than the echo pulse intervals $t_2$, $t_3$, or $t_4$.

It is desired to convert the time base of the wave form of Figure 3 which may be in the order of millionths of a second to a time base in the order of hundredths of a second. The apparatus for so converting the time intervals while maintaining the proportions among $t_1$, $t_2$, $t_3$, and $t_4$ unchanged is illustrated in Figure 1 of the drawings. The pulse train is fed to a lead 28 which connects with and feeds the pulse train to an amplifier-limiter 30 and a saw tooth generator 32. The transmitter or initial pulse 20 serves to trigger saw tooth generator 32 which then generates a linear saw tooth wave having a duration less than the basic repetitive time period $t_1$. The form of the output from saw tooth generator 32 is best illustrated in Figure 4 of the drawings and is designated generally by the numeral 34. It is to be noted that the trailing and downgoing edge 36 of wave form 34 occurs at a point in time prior to the termination of the pulse period $t_1$ whereby to provide a time interval designated by the portion of the wave form 38 between the trailing edge 36 of wave form 34 and the end of the pulse repetition period $t_1$.

The pulse train is also fed through the amplifier-limiter 30. Each pulse having an amplitude greater than a predetermined value is amplified and limited. As illustrated in the drawings, amplifier-limiter 30 is adjusted so that it can amplify and limit all of the illustrated pulses in the pulse train including the smallest pulse 26. The output from amplifier-limiter 30 is a series of substantially square wave forms with the leading edges thereof spaced apart the same time intervals as the leading edges of the corresponding pulses. More specifically, there is produced a square wave form 42 corresponding to pulse 20, a wave form 44 corresponding to pulse 22, a wave form 46 corresponding to pulse 24, and a wave form 48 corresponding to pulse 26. The widths of the wave forms 42 through 48 is roughly proportional to the magnitude of the corresponding pulse 20 through 26, respectively.

The output saw tooth wave 34 and the limited wave form group 40 are fed as the inputs to a gated amplifier 50. More specifically the saw tooth wave form 34 is applied to the input of the gating amplifier 50 through a line 52 as the amplification control voltage thereto. Wave form 40 is applied as the gating wave along line 54 whereby to control the time of conduction of amplifier 50. The output from gated amplifier 50 appears on a line 56.

The form of the output from gated amplifier 56 is best illustrated in Figure 6 of the drawings. Each of the wave form groups 40 is reproduced as a new wave form group generally designated by the numeral 60. Each of the wave forms in group 40 is amplified in an amount proportional to the value of the saw tooth wave form 34 applied to the gated amplifier 50 at the time that the wave form pulse wave form 40 is applied through line 54. As a consequence it will be seen that a pulse 62 in wave form 60 is produced corresponding to pulse 42 in wave form 40 which in turn corresponds to pulse 20 in the pulse group 18. Since the value of the saw tooth wave 34 is low when pulse 42 appears at the input to gated amplifier 50, the corresponding output pulse 62 has a relatively small value. Pulse 64 corresponding to wave form 44 has a higher amplitude since it occurs at a time corresponding to a greater value of the control saw tooth wave form 34. Output wave form 66 corresponding to wave form 46 is correspondingly greater as is wave form 68 corresponding to wave form 48 since each of these wave forms is amplified at a time when the control saw tooth voltage 34 is at a greater value. Accordingly, the wave forms 42 through 48 have been converted into a series of output wave forms 62 through 68, respectively which are of ascending amplitude, the increase of amplitude corresponding to the time interval between the leading edge of the corresponding wave form 42 through 48 and the leading edge of the transmitting or initiating pulse 20. The width of the output wave forms 62 through 68 varies in accordance with the amplitude of the corresponding original echo pulse 20 through 26, respectively.

It will be seen that the combination of the amplifier-limiter 30, the saw tooth generator 32 and the gating amplifier 50 has produced an output signal 60 in which the amplitude of the individual pulses is directly proportional to the time intervals between the leading edge of the pulse and the leading edge of the initial or transmitting pulse. If saw tooth wave generator 32 is of a type having an accurate and linear output wave form 34, the amplitude of the output wave form 62 through 68 will accurately reproduce the time intervals between the initial transmitting and echo pulses 20—26. It further can be seen that the ratio between the pulse amplitudes will remain constant although the amplitudes can be increased or decreased as desired by changing the slope of the saw tooth wave form 34.

It is next desired to convert the differences in amplitude of wave forms 62 through 68 to corresponding differences in time intervals on an expanded or low frequency time scale. This is accomplished by applying the warm form 60 of Figure 6 as one input to a double comparator 70. The second input to the double comparator 70 is a relatively low frequency saw tooth wave generated by a saw tooth generator 72. One of the outputs from generator 72 is applied through line 74 as an input to the double comparator 70. The wave form appearing on line 74 is generally designated by the numeral 76 and is best illustrated in Figure 7 of the drawings. Preferably the time interval $T_1$ corresponding to the length of a wave 76 is an integral multiple of the time interval $t_1$ of pulse group 18. It further is desirable that point 78 which indicates the beginning of the rise of saw tooth wave form 76 is lower in potential than the lowest potential of wave form 60 and positioned in time so that the saw tooth portion of wave form 76 crosses the zero potential for wave form 60 at the beginning of the pulse group 60. The trailing or decaying portion 80 of wave form 76 may terminate at any desired point short of the expiration of interval $T_1$ hereby to provide a short period 82 of constant amplitude wave form before the initiation of a second saw tooth portion 76. It will be understood that in order to arrange the wave forms as illustrated in Figure 7 in practice, it is necessary to be able accurately to adjust the frequency and the duration of the wave form 76 from saw tooth generator 72.

Referring particularly to Figure 7, it will be seen that for purposes of illustration the time interval $t_1$ of the original pulse group has been reduced in size as compared with Figures 3 through 6 and the waves 62 through 68 have been illustrated as lines instead of portions of saw tooth topped square pulses. It is to be understood, however, that the wave form 60 of Figure 7 is actually the wave form of Figure 6 on a reduced scale. On the reduced scale, wave form 62 essentially disappears and can be treated as a zero value amplitude wave form for purposes of this analysis.

The wave form 60 is fed through line 56 as one input to the double comparator 70 and the saw tooth wave form 76 is fed along line 74 as a second input to double comparator 70. Double comparator 70 is of the type which produces a substantially constant amplitude output whenever the amplitudes of wave form 60 and wave form 76 are substantially equal. Accordingly, there will be an output from double comparator 70 whenever wave form 76 crosses the zero potential value for wave form 60 since portion 62 thereof is substantially zero in value. The output from double comparator 70 is generally designated by the numeral 84 and the output wave form generated when saw tooth voltage 76 crosses the zero voltage value for wave form 60 is designated by the numeral 86. Accordingly, the leading edge of output wave form 86 corresponds to the leading edge of the initial or transmission pulse 20 in Figure 3.

When wave form 64 and saw tooth wave 76 appear of equal value as inputs to double comparator 70, an output wave form 88 is generated on the output line 90 of comparator 70. As the value of the saw tooth wave 76 continues to increase it eventually coincides in value with that of wave form 66 and when these two waves of substantially equal amplitude arrive at the double comparator at the same time, a third output 92 is formed. The coincident appearance of an amplitude of wave form 76 equal to that of wave form 68 and wave form 68 as inputs to double comparator 70 produces a fourth output 94 on line 90.

From the above analysis it is seen that the ratio between the time interval between the leading edge of wave forms 86 and 88, designated $T_2$ in the drawings, and the total wave form interval $T_1$ is the same as the ratio between $t_2$ and $t_1$. Correspondingly the ratio between $T_3$ and $T_1$ is the same as that between $t_3$ and $t_1$, etc. However, the absolute time intervals $T_1$, $T_2$, $T_3$ and $T_4$ will be several times and perhaps even hundreds of thousands of times greater than the corresponding time intervals $t_1$, $t_2$, $t_3$ and $t_4$, respectively. It will be seen therefore that there has been provided in essence a conversion in the time base scale from a high frequency or short interval basis to a low frequency or long time interval basis.

The time conversion can be made with a high degree of accuracy using the present invention. The accuracy does depend in part upon the linearity of the saw tooth wave forms 34 and 76 and therefore it is essential that these wave forms be as accurate and as linear as possible. It also is necessary that wave forms 34 and 76 be properly synchronized with the input wave form 18. It further is desirable that the time interval $T_1$ of wave forms 76 be an integral multiple of the input wave form 18 time interval $t_1$.

The degree of accuracy can be increased by increasing the ratio between $T_1$ and $t_1$, the accuracy becoming greater as this ratio is increased.

The output wave form 84 from double comparator 70 appearing on line 90 can be used to drive a suitable permanent recording apparatus such as the electromagnetic recorder generally designated by the numeral 96. Recorder 96 includes a writing element 98 cooperating with a moving strip of electrically sensitive recording paper 100. Movement of writing element 98 across paper 100 is controlled by a coil 102 which is energized by the output wave form 76 from saw tooth generator 72. A mark is formed on paper 100 whenever an output wave pulse such as pulses 86, 88, 92 and 94 is fed to writing element 98 along line 90 and passes through the paper 100 to a grounded platen 101. The resultant record is diagrammatically illustrated in Figure 2 of the drawings. In this record a series of dots is formed along the slow sweep of the recorder, each dot corresponding to a pulse in the initial pulse group 18. The distance between each dot and the beginning of the recorder sweep is proportional to the time delay of its corresponding echo pulse 22, 24 or 26.

In certain investigations it is desirable to make a rough quantitative analysis of the amplitude of each pulse and to record the time delay of each identified pulse. A circuit for accomplishing this is illustrated in Figure 9 of the drawings. Four parallel channels are provided, each channel being operated by and responsive only to input pulses having a predetermined amplitude. Each channel includes therefore a gating amplifier-limiter 104, a gated amplifier 50, a double comparator 70 and a recorder 96. Suffixes A, B, C and D have been added to the numbers to identify the four different channels. A saw tooth generator 32 is provided, saw tooth generator 32 providing the input signal for each of channels A, B, C and D. A low frequency saw tooth generator 72 is likewise provided to drive all of the channels A, B, C and D. More particularly, a line 73 connects the low frequency saw tooth generator 72 to each of the double comparators and a line 75 connects the generator 72 to each of the recorders 96 to provide one of the inputs thereto. In order to catalog the incoming pulses according to size, the gating amplifier-limiter 104A of channel A may be adjusted to register all pulses having an amplitude of 5 volts or greater. Gating amplifier 104B can be adjusted to pass and amplify only input echo pulses having an amplitude of 10 volts or more. Channel C can be similarly adjusted to respond only to echo pulses having an amplitude of 15 volts and channel D can be adjusted to respond only to echo pulses having an amplitude of 20 volts or more.

For purposes of illustration of the circuit of Figure 9, a pulse train 18 such as is shown in Figure 3 of the drawings will be analyzed in which the initial pulse 20 has a value in excess of 20 volts, echo pulse 22 has an amplitude of 11 volts, echo pulse 24 has an amplitude of 17 volts and echo pulse 26 has an amplitude of 6 volts. Echo pulse 20 having an amplitude of 20 volts when applied to input line 28 will serve to produce an output from each of channels A, B, C and D. Accordingly, there will be a mark at the zero time point on the record paper 100 of each of recorders 96A, 96B, 96C and 96D.

Echo pulse 22 having an amplitude of 11 volts will be capable of triggering channels A and B whereby to produce record marks on the recording paper of recorders 96A and 96B at time interval $T_2$. Echo pulse 24 having an amplitude of 17 volts will trigger each of channels A, B and C and, accordingly, will produce on the associated record papers dots at time interval $T_3$. The smallest value pulse 26 will energize only channel A and therefore there will be a record dot at interval $T_4$ only on recorder 96A. It can be seen from the above analysis that a study and inspection of the outputs from recorders 96A, 96B, 96C and 96D will serve to give an analysis of amplitude ranges of pulses appearing at particular times and therefore serve to catalog the pulses both as to amplitudes and as to time of occurrence after the initial or transmitting pulse.

There is shown in Figure 10 of the drawings a system wherein a simultaneous permanent record of both the amplitude and the time interval of delay of the input pulses in train 18 can be made on a single paper strip. The pulse train 18 is fed through an input line 28 to an amplifier-limiter 30 as described above and also to the input of a saw tooth generator 32 also as described above. In addition in this form of the invention the pulse train 18 is fed through a line 106 to an amplifier 108.

The outputs from the amplifier-limiter 30 and the saw tooth generator 32 are fed to a gated amplifier 50 and when combined produce a wave form 60 on output line 56. A low frequency saw tooth generator 72 of the type described above is provided and feeds a saw tooth wave 76 into a double comparator 70 along line 74. The output wave form 84 from double comparator 70 is fed along a line 110 to the control grid 112 of a gas discharge tube generally designated by the numeral 114. The anode 116 of tube 114 is connected through a line 118 to the output of amplifier 108. Accordingly, there is applied to anode 116 an amplified wave form proportional to the input wave form 18. Cathode 120 is connected to ground through a load resistance 122. The output developed across resistance 122 is fed through a line 124 to a recorder such as recorder 96 described above. A line 126 interconnects the low frequency saw tooth generator 72 and the recorder 96 to supply the other input to the recorder whereby the recorder displays and makes a record of both the amplitude of the pulses and the time interval therebetween.

It will be seen that there has been provided a time base converter which fulfills all of the objects and advantages set forth above. Although certain preferred forms of the invention have been shown for purposes of illustration, it is to be understood that various changes and modifications can be made therein without departing from the spirit and scope of the invention. Accordingly, the invention is to be limited only as set forth in the following claims.

What is claimed is:

1. A time base converter comprising apparatus to feed a series of repeating pulse patterns in which each pulse pattern has a finite time duration and each pulse within the pattern occurs at a time having a definite time relation to the finite time duration, a first device connected to said feed apparatus and responsive to the series of repeating pulse patterns to produce a first pulse group in which the relation between a predetermined characteristic of the pulses in the first pulse group is a function of the definite time relation of the pulses in the pulse patterns, a second device connected to said first device and responsive to the first pulse group to produce a second pulse group having a time duration substantially greater than the time duration of the pulse pattern and in which the individual pulses in the second pulse group have a definite time relation to the predetermined characteristic of the pulses in the first pulse group and to the time duration of the pulse group, the last mentioned definite time relation being proportional to the definite time relation between the individual pulses in the pulse pattern and the finite time duration of the pulse pattern.

2. A time base converter comprising apparatus to feed a series of repeating pulse patterns in which each pulse pattern has a definite time duration and each pulse within the pattern has a definite time relation to the finite time duration, a first device connected to said feed apparatus and responsive to the series of repeating pulse patterns to produce a first pulse group in which there are pulses corresponding to the pulses in the pulse pattern and the corresponding pulses in the first pulse group vary in amplitude as a predetermined function of the time spacing of the pulses in said pulse pattern, and a second device connected to said first device and responsive to the first pulse group to compare the pulses in the first pulse group with a second function proportional to the first function and having a substantially greater time duration than the pulse pattern and the first function, said second device producing an output when the amplitude of the pulse in the first pulse group is equal to the amplitude of the second function whereby to provide a second pulse group having a substantially greater time duration than the pulse pattern and the first pulse group and having a pulse therein corresponding to each pulse in the pulse pattern and the first pulse group, the time intervals between the second pulses being directly proportional to the time intervals between the pulses in the pulse pattern.

3. A time base converter comprising apparatus to feed a series of repeating pulse patterns in which each pulse pattern has a definite time duration and each pulse within the pattern has a definite time relation to the finite time duration, a first device connected to said feed apparatus and responsive to the series of repeating pulse patterns to produce a first pulse group in which there are pulses corresponding to the pulses in the pulse pattern and the corresponding pulses in the first pulse group vary in voltage amplitude as a saw tooth function of the time spacing of the pulses in the pulse pattern, and a second device connected to said first device and responsive to the first pulse group to compare the pulses in the first pulse group with a second saw tooth voltage function having a substantially greater time duration than the pulse pattern of the first function, said second device producing an output when the voltage amplitude of a pulse in the first pulse group is equal to the voltage amplitude of the second saw tooth function whereby to provide a second pulse group having a substantially greater time duration than the pulse pattern and the first pulse group and having a pulse therein corresponding to each pulse in the pulse pattern and the first pulse group, the time intervals between the second pulses being directly proportional to the time intervals between the pulses in the pulse pattern.

4. A time base converter comprising apparatus to feed a series of repeating pulse patterns in which each pulse pattern has a finite time duration and each pulse within the pattern has a definite time relation to the finite time duration, a gated amplifier connected to said feed apparatus, a first amplitude-time function generator connected as a second input to said gated amplifier, the output of said gated amplifier being a first pulse group including therein a pulse corresponding to each pulse in the pulse pattern with each pulse having an amplitude proportional to the time lapse between the beginning of the pulse pattern and the occurrence of the pulse, a double comparator connected to the output of said gated amplifier, a second time-amplitude function generator connected to said double comparator, the time base of said second function generator being substantially greater than the finite time duration of the pulse pattern, the output from said comparator being a second pulse group having a time duration substantially greater than that of the pulse pattern and including therein a pulse corresponding to each pulse in the pulse pattern, the time intervals between the pulses in the second pulse group being directly proportional to the time intervals between the pulses in the pulse pattern.

5. A time base converter comprising apparatus to feed a series of repeating pulse patterns in which each pulse pattern has a finite time duration and each pulse within the pattern has a definite time relation to the finite time duration, a gated amplifier connected to said feed apparatus, a first saw tooth wave form generator connected as a second input to said gated amplifier, the output of said gated amplifier being a first pulse group including therein a pulse corresponding to each pulse in the pulse pattern with each pulse having an amplitude proportional to the time lapse between the beginning of the pulse pattern and the occurrence of the pulse, a double comparator connected to the output of said gated amplifier, a second saw tooth wave form generator connected to said double comparator, the time base of the output from said second saw tooth wave form generator being substantially greater than the finite time duration of the pulse pattern, the output from said comparator being a second pulse group having a time duration substantially greater than that of the pulse pattern and including therein a pulse corresponding to each pulse in the pulse pattern, the time intervals between the pulses in the second pulse group being directly proportional to the time intervals between the pulses in the pulse pattern.

6. A time base converter comprising apparatus to feed a series of repeating pulse patterns in which each pulse pattern has a finite time duration and each pulse within the pattern has a definite time relation to the finite time duration, an amplifier-limiter connected to said feed apparatus and producing as an output therefrom a series of constant amplitude pulses corresponding to the pulses in the pulse pattern, a first amplitude-time function generator connected to said feed apparatus and synchronized by the first pulse in the pulse pattern and producing an amplitude-time function having a period equal to the time duration of the pulse pattern, a gated amplifier having applied as the gating input thereto the output from said amplifier-limiter and having as an amplification control input thereto the output of said first amplitude-time function generator, a double comparator having as one input thereto the output of said gated amplifier, a second amplitude-time function generator generating an output function having a time base substantially greater than the time base of the pulse pattern, said second amplitude-time function generator being a second input to said double comparator, the output from said double comparator being a pulse group having a time base substantially greater than that of the pulse pattern and with each pulse therein corresponding to a pulse in the pulse pattern, the time intervals between the pulses in the pulse group and the time intervals between the pulses in the pulse pattern being directly proportional.

7. A time base converter comprising apparatus to feed a series of repeating pulse patterns in which each pulse pattern has a finite time duration and each pulse within the pattern has a definite time relation to the finite time duration, an amplifier-limiter connected to said feed apparatus and producing as an output therefrom a series of constant voltage amplitude pulses corresponding to the pulses in the pulse pattern, a first saw tooth voltage generator connected to said feed apparatus and synchronized by the first pulse in the pulse pattern and producing a saw tooth voltage wave having a period equal to the time duration of the pulse pattern, a gated amplifier having applied as the gating input thereto the output from said amplifier-limiter and having as an amplification control input thereto the output of said first saw tooth generator, a double comparator having as one input thereto the output of said gated amplifier, a second saw tooth voltage generator generating a second saw tooth wave form having a time base substantially greater than the time base of the pulse pattern, the second saw tooth wave form being a second input to said double comparator, the output from said double comparator being a pulse group having a time base substantially greater than that of the pulse pattern and with each pulse therein corresponding to a pulse in the pulse pattern, the time intervals between the pulses in the pulse group and the time intervals between the pulses in the pulse pattern being directly proportional.

8. A time base converter comprising apparatus to feed a series of repeating pulse patterns in which each pulse pattern has a finite time duration and each pulse within the pattern has a definite time relation to the finite time duration, an amplifier-limiter connected to said feed apparatus and producing as an output therefrom a series of constant amplitude pulses corresponding to the pulses in the pulse pattern, a first saw tooth generator connected to said feed apparatus and synchronized by the first pulse in the pulse pattern and producing a saw tooth wave having a period equal to the time duration of the pulse pattern, a gated amplifier having applied as the gating input thereto the output from said amplifier-limiter and having as an amplification control input thereto the output of said first saw tooth generator, a double comparator having as one input thereto the output of said gated amplifier, a second saw tooth generator generating a second saw tooth wave form having a time base substantially greater than the time base of the pulse pattern, the second saw tooth wave form being a second input to said double comparator, the output from said double comparator being a pulse group having a time base substantially greater than that of the pulse pattern and with each pulse therein corresponding to a pulse in the pulse pattern, the time intervals between the pulses in the pulse group and the time intervals between the pulses in the pulse pattern being directly proportional, and a recorder connected to the output of said double comparator.

9. A cataloguer comprising a plurality of amplitude discriminating and time base converting channels, each of said channels being responsive to a different amplitude pulse and including a gating amplifier-limiter, a gated amplifier connected to and having as one of the inputs thereto the output of said gating amplifier-limiter, a first saw tooth generator supplying the second input to each of said gated amplifiers, each gated amplifier being connected to and furnishing one input for a double comparator, a second saw tooth generator having as an output therefrom a saw tooth wave having an amplitude at least as great as the output from said first saw tooth generator and having a time base substantially greater than said first saw tooth generator and connected as a second input to each of said double comparators.

10. A cataloguer comprising a plurality of amplitude discriminating and time base converting channels, each of said channels being responsive to a different amplitude pulse and including a gating amplifier-limiter, a gated amplifier connected to and having as one of the inputs thereto the output of said gating amplifier-limiter, a first saw tooth generator supplying the second input to each of said gated amplifiers, each gated amplifier being connected to and furnishing one input for a double comparator, a second saw tooth generator having as an output therefrom a saw tooth wave having an amplitude at least as great as the output from said first saw tooth generator and having a time base substantially greater than said first saw tooth generator and connected as a second input to each of said double comparators, and a recorder connected to the output of each of said double comparators and the output of said saw tooth generator to make a permanent record of the outputs of each of said channels.

11. A device for permanently recording the amplitude of individual pulses in a repeating pulse pattern on a time base substantially greater than the time base in the original pulse pattern, comprising an amplifier-limiter having the pulse pattern as an input thereto, a gated amplifier connected to said amplifier-limiter and having the output from said amplifier-limiter as one of the inputs thereto, a first saw tooth generator connected to and triggered by the pulse pattern and having the output thereof connected as the second input to said gated amplifier, a double comparator connected to the output of said gated amplifier as one of the inputs thereto, a second saw tooth generator having a time base substantially greater than the time base of the pulse pattern connected to said comparator and having the output therefrom as one of the inputs to said comparator, a gas triode having an anode, a cathode and a control grid, said cathode being connected to a load resistance, an amplifier having as an input thereto the pulse pattern and having the output thereof applied between said anode and the other end of said load resistance, the control grid of said tube being connected to the output of said double comparator, and a recorder connected across said load resistance to record both the amplitude and the time relation of the pulses in the pulse pattern on an expanded time base.

12. A device for displaying the amplitude of individual pulses in a repeating pulse pattern on a time base substantially greater than the time base in the original pulse pattern, comprising an amplifier-limiter having a pulse pattern as an input thereto, a gated amplifier connected to said amplifier-limiter and having the output from said amplifier-limiter as one of the inputs thereto, a first saw tooth generator connected to and triggered by the pulse pattern and having the output thereof connected as the second input to said gated amplifier, a double comparator connected to the output of said gated amplifier as one of the inputs thereto, a second saw tooth generator having a time base substantially greater than the time base of the pulse pattern connected to said comparator having the output therefrom as one of the inputs to said comparator, a gas triode having an anode, a cathode and a control grid, said cathode being connected to a load resistance, an amplifier having as an input thereto the pulse pattern and having the output thereof applied between said anode and the other end of said load resistance, the control grid of said tube being connected to the output of said double comparator, and a display device connected across said load resistance and connected to said second saw tooth generator simultaneously to display the amplitude and the time relation of the pulses in the pulse pattern on an expanded time base.

13. A cataloger comprising a plurality of amplitude discriminating and time base converting channels, apparatus to feed a series of repeating pulse patterns in which each pulse pattern has a finite time duration and each pulse within the pattern occurs at a time having a definite time relation to the finite time duration, each of said channels being responsive to a different amplitude pulse and including a first device connected to said feed apparatus and responsive to the series of repeating pulse patterns to produce a first pulse group in which the relation therein between a predetermined characteristic of the pulses is a function of the definite time relation of the pulses in the pulse patterns, a second device connected to said first device and responsive to the first pulse group to produce a second pulse group having a time duration substantially greater than the time duration of the pulse pattern and in which the individual pulses in the second pulse group have a definite time relation to the predetermined characteristic of the pulses in the first pulse group and to the time duration of the pulse of the first pulse group, the last mentioned definite time relation being proportional to the definite time relation between the individual pulses in the pulse pattern passed by the channel and the finite time duration of the pulse pattern.

14. A cataloger comprising a plurality of amplitude discriminating and time base converting channels, apparatus to feed a series of repeating pulse patterns in which each pulse pattern has a finite time duration and each pulse within the pattern occurs at a time having a definite time relation to the finite time duration, each of said channels being responsive to a different amplitude pulse and including a first device connected to said feed apparatus and responsive to the series of repeating pulse patterns to produce a first pulse group in which there are pulses corresponding to the pulses in the pulse pattern passed by the channel and the corresponding pulses in the first pulse group vary in voltage amplitude as a saw tooth function of the time spacing of the pulses in the pulse pattern, a second device connected to said first device and responsive to the first pulse group to compare the pulses in the first pulse group with a second saw tooth voltage function having a substantially greater time duration than the pulse pattern, said second device producing an output when the voltage amplitude of a pulse in the first pulse group is equal to the voltage amplitude of the second saw tooth function whereby to provide a second pulse group having a substantially greater time duration than the pulse pattern and the first pulse group and having a pulse therein corresponding to each pulse in the pulse pattern passed by the channel and in the first pulse group, the time intervals between the second pulses being directly proportional to the time intervals between the pulses in the pulse pattern passed by the channel.

15. A device for displaying the amplitude of individual pulses in a repeated pulse pattern on a time base substantially greater than the time base in the original pulse pattern, comprising apparatus to feed a series of repeating pulse patterns in which each pulse pattern has a finite time duration and each pulse within the pattern occurs at a time having a definite time relation to the finite time relation, a first device connected to said feed apparatus and responsive to the series of repeating pulse patterns to produce a first pulse group in which the relation between a predetermined characteristic of the pulses in the first pulse group is a function of the definite time relation of the pulses in the pulse patterns, a second device connected to said first device and responsive to the first pulse group to produce a second pulse group having a time duration substantially greater than the time duration of the pulse pattern and in which the individual pulses in the second pulse group have a definite time relation to the predetermined characteristic to the pulses in the first pulse group and to the time duration of the first pulse group, the last mentioned definite time relation being proportional to the definite time relation between the individual pulses in the pulse pattern and the finite time duration of the pulse pattern, an amplifier having the input thereof connected to said feed apparatus, and a display device having one input thereof connected to the output of said second device and another input thereof connected to the output of said amplifier simultaneously to display the amplitude and the time relation of the pulses in the pulse pattern on an expanded time base.

16. A device for displaying the amplitude of individual pulses in a repeated pulse pattern on a time base substantially greater than the time base in the original pulse pattern, comprising apparatus to feed a series of repeating pulse patterns in which each pulse pattern has a finite time duration and each pulse within the pattern occurs at a time having a definite time relation to the finite time relation, a first device connected to said feed apparatus and responsive to the series of repeating pulse patterns to produce a first pulse group in which the relation between a predetermined characteristic of the pulses in the first pulse group is a function of the definite time relation of the pulses in the pulse patterns, a second device connected to said first device and responsive to the first pulse group to produce a second pulse group having a time duration substantially greater than the time duration of the pulse pattern and in which the individual pulses in the second pulse group have a definite time relation to the predetermined characteristic to the pulses in the first pulse group and to the time duration of the first pulse group, the last mentioned definite time relation being proportional to the definite time relation between the individual pulses in the pulse pattern and the finite time duration of the pulse pattern, a display device having one input thereof connected to the output of said second device, and means to apply a signal to another input of said display device proportional to the amplitude of a pulse in the pulse pattern when the pulse in the second pulse group corresponding thereto appears as an input to said last mentioned means.

References Cited in the file of this patent

UNITED STATES PATENTS

| | | |
|---|---|---|
| 2,430,307 | Smith | Nov. 4, 1947 |
| 2,659,651 | Benno | Nov. 17, 1953 |
| 2,759,784 | Burke | Aug. 21, 1956 |

FOREIGN PATENTS

| | | |
|---|---|---|
| 580,538 | Great Britain | Sept. 11, 1946 |